March 6, 1962 — G. F. ZIFFER — 3,024,404

SERVOMOTOR CONTROL SYSTEM

Filed July 15, 1959

INVENTOR.
GARRET F. ZIFFER
BY
ATTORNEY

United States Patent Office 3,024,404
Patented Mar. 6, 1962

3,024,404
SERVOMOTOR CONTROL SYSTEM
Garret F. Ziffer, Wayland, Mass., assignor, by mesne assignments, to Laboratory for Electronics, Inc., Boston, Mass., a corporation of Delaware
Filed July 15, 1959, Ser. No. 827,238
4 Claims. (Cl. (Cl. 318—484)

This invention relates in general to automatic process control systems and more particularly to techniques and apparatus for compensating for backlash inherent in electromechanical control elements.

Automatic process control systems are now widely used in industrial plants in order to maintain rigid tolerances on the critical parameters of a process. Automatic control systems ordinarily form a closed loop including the production plant itself as an integral element. The other included elements are a transducer sensing element, a comparator unit, a controller unit, and a control element. In general the operation of such a system is as follows: A continuing disturbance from some external source at the process plant causes variation in a critical parameter of the process material. The transducer, which may be any sensing element capable of translating this variation into a usable signal, then provides an output proportional to this variation. The transducer output is compared to a predetermined signal level, representing the ideal or "set point" value of the process material in the comparator circuit. The comparator then provides as its output the deviation of the transducer signal from this set point value, which deviation is then translated into a correction signal by the controller. The controller develops a correction signal which is a function of the deviation from set point and applies it to the control element itself, which operates on the process plant in a suitable manner to compensate for the disturbance.

Such process control systems may be operated in any of several modes. In one such mode the correction signal applied to the control element is made proportional to the deviation expressed by the comparator. This mode is termed proportional correction. It has, however, deficiencies stemming from the completely closed loop nature of this system.

An apparatus which overcomes these deficiencies is described in co-pending application Ser. No. 803,799. This apparatus provides an interrupted electronic control, which senses the deviation from set point and applies a correction signal proportional to the magnitude of this deviation to the control element. The comparator then is inactivated for an "interruption period" before again sensing the deviation. This interruption period is made longer in duration than the plant delay, hence a second correction can be made only after the transducer has sensed the results of the first correction. It will be readily understood that the efficient operation of this control depends upon the proportionality of the control element response to the correction signal, since if the control element responds in a truly proportional manner and if the disturbance which originally caused this deviation is relatively stable, only one cycle of operation would be required to return the material to set point.

The proportionality of the control element will, of course, depend on the particular control element mechanism. For example, in a plastic or rubber sheet fabrication process the control element employed is usually a screw-down motor which varies the position of a calender roll. Since the calender rolls themselves may weigh several tons and since a good deal of compression is involved when these rolls are being moved against the mass of the process material, a rather large amount of force is required to vary their position. The motors generally used to provide this positioning force are only a few horsepower, but operate at high speeds, developing the necessary force by the use of large gear ratios in the train between the motor and the calender rolls. In a typical plant, a linear displacement of the calender roll a distance of .006 inch per minute of operation of the motor may be achieved, at a motor speed of 1800 revolutions per minute. While there are several factors which may influence the proportionality of response of such an element, one very important non-linearity is contributed by backlash effects. These occur when two successive corrections are in opposite directions, since a considerable fraction of the duration of the second correction is taken up in overcoming the slack in the system before motion is achieved in the new direction. Because the proportionality of correction signal to deviation is represented by the duration of activation of the control element, non-linearities are thus created, which have amounted to as much as a 50% error.

It is therefore a primary object of the present invention to provide electronic means which will compensate for backlash effects in an automatic process control system.

It is another object of this invention to provide an efficient, novel, electronic backlash compensator which will, however, not be activated if external events render compensatory action unnecessary.

It is a further object of this invention to provide an automatic process control system in which backlash effects are compensated for.

In general this invention provides in combination a bistable memory element which indicates the direction of the last previous correction, a timing means which operates at the end of an applied correction to add compensation if the previous compensation was in the opposite direction, and means for allowing this additional correction to be made only if the transducer is indicating deviation of the process material beyond acceptable predetermined limits. These and other objects and advantages will become apparent from the following detailed description when taken in conjunction with the accompanying drawing in which:

Figure 1:
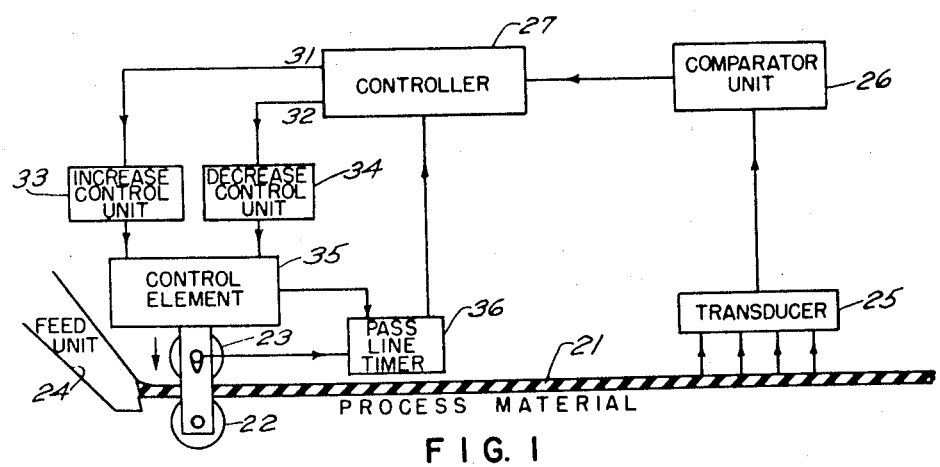
FIG. 1 is an illustration in diagrammatic form of an automatic process control system.

Referring now to FIG. 1, a process control system is illustrated in which a process material 21 has its thickness controlled by the operation of calender rolls 22 and 23 on material from feed unit 24. This thickness is achieved by the vertical movement of calender roll 23, roll 22 remaining in a fixed position. A transducer element 25 is seen to be located above the process material a short distance from rolls 22 and 23. This element may take any of several forms but must be capable of providing an output signal representative of the thickness of process material passing underneath it. This output is fed to comparator unit 26, which compares the value of the transducer output to a predetermined value, called set point, representing the desired thickness. The comparator unit then presents to the input of controller unit 27 a signal which is proportional to the magnitude of the deviation of the transducer signal from this predetermined value. The controller unit develops a correction signal of duration proportional to the deviation presented at its input and provides this correction signal to one of its two outputs 31 and 32. The direction of the deviation from set point determines which of the two outputs 31 and 32 is energized. Thus, if the transducer signal indicates that the process material is too thin, controller output 31 which activates increase control unit 33 is energized, while if the transducer indicates the process material is too thick, controller output 32, which activates decrease control unit 34, is energized. Control units 33 and 34 act on control element 35 which is directly coupled to a calender roll 23 and determines its vertical position. Increase control unit 33 operates control element 35 in one direction while decrease control unit 34 operates the same element in the opposite direction. Pass line timer 36 is coupled to the rotational movement of calender roll 23 and thus measures the amount of process material passing through it. The timer 36 action is initiated by a signal from control element 35. This timer unit provides, upon receiving its initiating signal, an output to controller unit 27 for a period of time corresponding to the passage of sufficient material through the calender rolls so that the material which was formed by the calender rolls at the time of the initiating signal has arrived beneath the transducer. This output signal from the pass line timer 36 to controller has the function of disabling the controller for its duration.

The above described automatic process control operates essentially as an interrupted closed loop. The transducer provides a signal representative of material thickness to the comparator unit, and the comparator unit together with the controller unit develop a signal having a duration proportional to the magnitude of the deviation from a predetermined set joint. This signal is then applied through the appropriate control unit to the control element, which upon deactivation initiates a timing cycle of the pass line timer providing an interruption period to prevent further corrections from being applied until the results of the initial correction are observable at the transducer. As previously indicated, if two successive corrections are in opposite directions, backlash effects in the control element may cause serious disproportionality in the second correction. The backlash compensation unit of the present invention is included within the controller unit and serves, when the second correction is in the opposite direction from the first, to extend the duration of the activation signal to the control element. The duration of this extension is determined by the particular control element and may be established in a manner to be described below.

Figure 2:
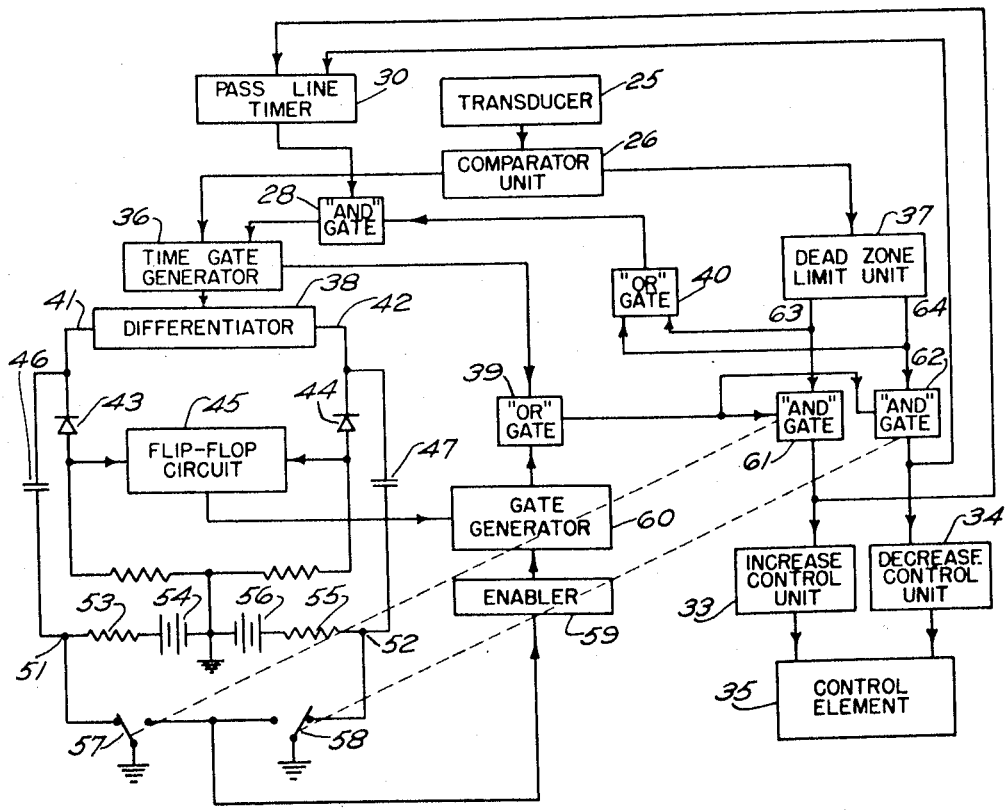
FIG. 2 is an illustration in diagrammatic form of one embodiment of this invention.

With reference now specifically to FIG. 2 there is shown one embodiment of the backlash compensator process control system of this invention, in which like numbers refer to like parts of FIG. 1. The output of a transducer unit 25 is coupled to a comparator unit 26. As previously indicated the transducer may be any element capable of sensing variations in the parameter of the process material to be controlled, and the comparator unit compares the output of the transducer unit to a predetermined value, called set point, corresponding to the optimum value of this same parameter. The output of the comparator unit is then a signal representative of the deviation of the transducer signal from this set point value. This output is coupled to both time gate generator 36 and dead zone limit unit 37. Time gate generator 36 is a unit which provides in response to a trigger pulse a constant voltage output pulse whose duration is proportional to the magnitude of the voltage presented at its input. This unit may, for example, be a phantastron circuit, which has an exceptionally linear dependence of output duration on input amplitude. The output pulse from time gate generator 36 is coupled to both differentiator 38 and through "or" gate 39 to "and" gates 61 and 62. Differentiator 38 has two symmetrical outputs 41 and 42, which couple through diodes 43 and 44 respectively, oriented so that they pass negative pulses only, to independent inputs of flip-flop circuit 45. Differentiator outputs 41 and 42 are also coupled through capacitors 46 and 47 respectively, to junctions 51 and 52. Each of these two junctions is coupled through a resistor and battery to electrical ground. These elements are shown as resistor 53 and battery 54 connecting to junction 51 and resistor 55 and battery 56 connecting to junction 52. Junction 51 is also electrically connected to one contact of single pole double throw switch 57, while junction 52 is electrically connected to one contact of single throw double pole switch 58. The arms of both switches 57 and 58 are electrically connected to ground and the second contact on each switch 16 is coupled in common to enabler unit 59, which upon being grounded provides an enabling signal to gate generator 60. The position of both switches is controlled by "and" gates 61 and 62. Flip-flop circuit 45 is coupled to gate generator 60 in such a way that when the flip-flop circuit changes state a pulse is presented to generator 60 which, provided enabler 59 is enabling this generator, triggers it and thereby provides a fixed duration output pulse. The duration of this output may be preset in a manner to be described below. The pulse output of gate generator 60 is coupled through "or" gate 39 to "and" gates 61 and 62.

Dead zone limit unit 37 has two outputs 63 and 64, output 63 being energized when the input signal to the dead zone unit from comparator 26 exceeds a preset limit in one direction, while output 64 is energized when the input exceeds a preset limit in the other direction. Output 63 couples to "and" gate 61, the output of which is connected to increase control unit 33 which in turn is coupled to control element 35. Output 64 is coupled to "and" gate 62, and this gate output is connected to decrease control unit 34, which also provides an output to control element 35.

Outputs 63 and 64 of the dead zone limit unit 37 are also coupled through "or" gate 40 to "and" gate 28. A second input of "and" gate 28 is coupled to pass line timer 30, and, provided that an enabling output from the pass line timer coincides with the energizing of one of the dead zone limit outputs, a triggering pulse is transmitted from "and" gate 28 to initiate action of time gate generator 36. The pass line timer 30 is a unit which upon being initiated provides a disabling pulse at its output for a preset duration. This action is initiated whenever either "and" gate 61 or "and" gate 62 change from the energized to de-energized state; that is whenever a control action is terminated.

Having described the elements and their interconnection the operation of this system will now be discussed. As indicated above, the output from comparator unit 26 represents the deviation of the transducer signal from set point. This on the one hand triggers time gate generator 36 and on the other appears at the input of dead zone limit unit 37. In order to better understand the sequence of operations, it will be described first without inclusion of the backlash compensation feature and then the effect of this feature on the sequence will be discussed. Thus, if the deviation at the input of dead zone limit unit 37 exceeds the preset limits either output 63 or output 64 will be energized. The presetting of these limits is a matter of choice and is determined by the tolerances within which the process material variation must be maintained. This energized output is then fed through "or" gate 40 to "and" gate 28. If pass line timer 36 is not within its interruption cycle then a signal is being presented from it to the second leg of the "and" gate 28 and hence this gate transmits a signal to time gate generator 36, which signal serves to trigger this unit. Upon being triggered, gate generator 36 provides a constant voltage output pulse of positive polarity, the duration of which is a function of the amplitude of the deviation from the comparator unit at the time of triggering. This output pulse is coupled through "or" gate 39 (the function of which will be explained below) to both "and" gates 61 and 62. It will be understood that, provided the deviation remains beyond the appropriate dead zone limit, one of these two latter "and" gates will have a signal on both of its input legs, one from the dead zone limit unit and one from the time gate generator and as long as this condition holds, the "and" gate will provide a signal to one of the control units 33 or 34, depending on the direction in which the deviation exceeded the dead zone limit. Increase control unit 33 acts on control element 35 to drive it in one direction, whereas decrease control unit 34 operates to drive it in the opposite direction, thereby either increasing or decreasing the process material parameter to effect a return to set point.

As was discussed previously the function of the backlash compensation unit is to extend the time of correction when a corrective action is in the opposite direction from the last previous corrective action, and this requires both memory of the direction of the last corrective action and a gating pulse of pre-determined duration which can be applied to the appropriate control unit. The additional correction time is to be added only at the end of a corrective action and this is accomplished by differentiating the time gate generator pulse 36 at differentiator 38, and allowing only the negative portion of the differentiated pulse to apply to the inputs of flip-flop circuit 40. Since, of course, the negative portion is at the trailing edge of the time gate generator, this action follows precisely at the end of the corrective action. The passage of only negative pulses is afforded by the action of diodes 43 and 44. Flip-flop circuit 45 may be a conventional bi-stable element which provides an output pulse when it changes state and which has two independent inputs so arranged that the circuit will change state only if a signal is presented on an input different from the one last previously energized. Accordingly, the differentiated time gate pulse then will change the state of the flip-flop circuit 45 if its last previous change of state occurred on the other input. The determination of which input will receive the differentiated pulse is made by switches 57 and 58 as described below. The movable arm of both switches is electrically grounded and normally resting on the contact connected to junction 51 or 52, which in turn is coupled through its respective capacitor 46 or 47 directly to the output of the differentiator. Hence, in this normal position the differentiator output is dynamically grounded and no pulse signal will be generated thereon. However, switches 57 and 58 are mechanically linked, as for example by a relay coil, to "and" gates 61 and 62 respectively, in such a manner that when the "and" gate output is energized the switch arm is changed to its other contact. Whenever a correction is made, one of the "and" gates does have an energized output and accordingly one of the switches is moved. When it does it ungrounds the corresponding output of differentiator 38 and allows the negative differentiated pip to be passed to the corresponding side of the flip-flop circuit. If, in a particular case, the signal presented to the flip-flop circuit is on the opposite input from the last previous one and the circuit changes state, an output pulse is passed to gate generator 60. This gate generator produces a fixed duration, constant voltage pulse and has the function of adding a fixed correction time for backlash compensation. The duration of this pulse is determined by empirical calibration, which takes the form of experiments showing how much time must be added to a correction in an opposite direction from a previous one to provide the same amount of change as an equivalent correction in the same direction. This gate generator output pulse is coupled through "or" gate 39 to "and" gates 61 and 62 and hence when it is activated, serves the same function as time gate generator 36 did in maintaining activation of the control element through the appropriate control unit. Provision is made so that if the input to the dead zone limits returns within those limits prior to the end of time gate generator 36 pulse and hence prior to the action of the flip-flop circuit, backlash gate generator 60 will not be activated. This is accomplished by enabler unit 59 which, when grounded by the action of switch 57 or 58 moving off its normal contact and onto the contact connected to the enabler unit, enables gate generator 60 to operate. However, should switch 57 or 58 return to its normal position, which will occur if the deviation returns within the dead zone limits, the enabler is then ungrounded and hence the gate generator 60 cannot provide its output pulse. The purpose of so doing is to prevent inefficiency in that if the deviation does not exceed the limits, no further correction need be made and while the operation of "and" gates 61 and 62 would prevent this, inactivation of gate generator 60 is desirable in order to prevent unnecessary "dead time" in the system.

One aspect of the above system which has not hitherto been mentioned arises when a correction is made and the last previous correction was in the opposite direction, but the comparator deviation returns within the dead zone before the termination of the pulse from time gate generator 36. In this case there is no need to add the backlash compensation and as previously indicated, the apparatus will not add it. However, it is necessary to indicate in the flip-flop memory circuit that the correction in this direction has taken place in order to have the flip-flop in the correct condition for the next correction. This latter function is accomplished through the action of either switch 57 or 58 and the battery resistor combinations tied to junctions 51 and 52. While the arm of switches 57 and 58 are in their normal position this junction is grounded; however, when either of these switches has its position changed this junction is ungrounded and therefore a positive potential appears on it and charges either capacitor 46 or capacitor 47. When the deviation returns within the dead zone limit prior to the expiration of time gate generator 36 pulse the appropriate junction is instantaneously grounded, discharging its corresponding capacitor and thus causing a negative pulse to appear on the input of the flip-flop circuit associated with the particular switch, and this negative pulse changes the state of the flip-flop circuit in the same manner as the differentiated trailing edge of the time gate pulse. Of course, when the time gate pulse does terminate, the differentiated trailing edge will again appear but if the switch has remained in its normal position this pulse does not reach the flip-flop circuit and even if the return within dead zone limits is very temporary and the limits are again exceeded in the same direction before the final expiration of time gate generator pulse, this differentiated pulse will appear at the same input of the flip-flop circuit as did the pulse created by the return within the limits. This will not change the state of the flip-flop circuit.

The overall operation then is one of applying proportional corrective action and adding to it a compensating action whenever and only whenever backlash must be compensated for. Referring again to FIG. 1 the process plant is shown as a sheet fabrication unit with calender rolls, but the invention disclosed herein may apply to an automatic process control system operating on any type of plant to which interrupted electronic control is applicable. While one preferred embodiment has been described, it should be understood that numerous modifications and departures can now be made by those skilled in the art, the invention herein is to be contrued as limited only by the spirit and scope of the appended claims.

What is claimed is:

1. Control apparatus comprising a transducer which provides a signal varying in accordance with changes in a variable to be controlled, comparator means providing as an output a signal representative of the magnitude of difference between a standard signal and said transducer signal, limit recognition means providing an output characteristic of the sense of said difference, said output only being provided when the magnitude of said difference exceeds a predetermined level, control means responsive to the output of said limit recognition means, said control means operating in one direction when said limit recognition means has one sense characteristic and in the opposite direction when said limit recognition has the opposite sense characteristic, the duration of operation of said control means being proportional to the magnitude of the difference between said transducer and said standard signal, a memory element which retains the information as to the direction of the immediately previous operation of said control means, means operative at the termination of each operation of said control means to provide a fixed duration output pulse if said operation was in an opposite direction to the last previous operation, said fixed duration output pulse continuing the operation of said control means if said limit recognition means continues to provide an output.

2. Control apparatus comprising a transducer member which provides a signal varying in accordance with changes in a material to be controlled, control means responsive to the variation of said signal beyond predetermined limits and operative to bring about changes in said material in a sense to return said signal within said predetermined limits, said transducer member being positioned with respect to said control means in such manner that the effects of operation of said control means are indicated at said transducer at a point in time subsequent to the operation of said control means, said control means being operated for a period of time proportional to the deviation of said signal from a predetermined value, said control means being operated in one direction when said deviation exceeds the said predetermined limit in one direction and in the opposite direction when said deviation exceeds the predetermined limits in the opposite direction, means indicative of the direction of the immediately previous operation of said control means, means operative at the termination of operation of said control means to provide an output pulse if the operation of said control means is in a direction opposite to the last previous operation of said control means, said fixed duration output pulse being applied to said control means to continue its operation, whereby backlash effects in said control means are compensated for.

3. Control apparatus comprising a transducer providing a signal varying in accordance with changes in a variable to be controlled, comparator means providing as an output a signal representative of the difference between a standard signal and said transducer signal, limit recognition means providing an output characteristic of the sense of said difference, said output only being provided when the magnitude of said difference exceeds a predetermined level, control means responsive to the output of said recognition means, said control means operating in one direction when said limit recognition output has one sense characteristic and in the opposite direction when said limit recognition output has the opposite sense characteristic, the duration of operation of said control means being proportional to the magnitude of the difference between said transducer and said standard signal, means for providing a signal to a bi-stable circuit element at the termination of operation of said control means, said signal being adapted to change the state of said bi-stable element if the operation of said control means is in a direction opposite to the last previous operation of said control means, a pulse gate generator responsive to the change of state of said bi-stable means and adapted to produce a pulse whose duration is sufficient to compensate for backlash effects in said control means, said pulse being applied to said control means to continue the operation of said control means whereby backlash effects are compensated for, means responsive to the return of said difference signal within said limit recognition means and adapted to inhibit the operation of said control means upon said return within said limit recognition means.

4. Control apparatus comprising a transducer which provides a signal varying in accordance with changes in a variable to be controlled, comparator means providing as an output a signal representative of the difference in magnitude between said transducer signal and a standard signal, said standard signal being selected to correspond to said transducer signal at an optimum value of said variable, a limit recognition unit, said limit recognition unit providing an output when said comparator unit output exceeds a predetermined limit of deviation from said standard signal in one direction and a second output when said comparator unit output exceeds an independently determined limit of deviation from said standard signal in the opposite direction, a time gate generator adapted to provide in response to an applied stimulus an output pulse whose duration is proportional to the magnitude of difference expressed by said comparator unit, said stimulus being supplied by either output from said limit recognition unit, control means adapted to operate upon a coincidence of said time gate generator output and said limit recognition unit output, said control means operating in one direction in response to one output of said recognition unit and in the opposite direction in response to the other output of said limit recognition unit and in a sense to balance said transducer signal with said standard signal, a bi-stable element operative at the termination of said control operation and adapted to change state only if said control operation is in a direction opposite to the last preivous control operation, means operative upon the change of state of said bi-stable element to continue the operation of said control means for a period sufficient to compensate for backlash effects within said process control apparatus, said means for continuing the operation of control means being operative only as long as said limit recognition unit continues to provide an output.

References Cited in the file of this patent
UNITED STATES PATENTS

| | | |
|---|---|---|
| 2,537,083 | Peoples | Jan. 9, 1951 |
| 2,790,945 | Chope | Apr. 30, 1957 |
| 2,840,771 | Kamm | June 24, 1958 |